(12) United States Patent
Lo et al.

(10) Patent No.: US 7,992,438 B2
(45) Date of Patent: Aug. 9, 2011

(54) MULTIAXIAL GYROSCOPE

(75) Inventors: Yuan Lo, Taoyuan County (TW);
Chui-Kunn Chiu, Taoyuan County (TW); Sheng Jing Ku, Taoyuan County (TW); Chih Wei Tseng, Taoyuan County (TW); Kye-Chyn Ho, Taoyuan County (TW)

(73) Assignee: Chung Shan Institute of Science and Technology, Armaments Bureau, M.N.D., Taoyuan County (TW)

( * ) Notice: Subject to any disclaimer, the term of this patent is extended or adjusted under 35 U.S.C. 154(b) by 805 days.

(21) Appl. No.: 11/946,294

(22) Filed: Nov. 28, 2007

(65) Prior Publication Data
US 2009/0133498 A1   May 28, 2009

(51) Int. Cl.
*G01C 19/00* (2006.01)
(52) U.S. Cl. .................................. 73/504.13; 73/503.3
(58) Field of Classification Search ............... 73/504.13, 73/503.3, 504.08, 510, 504.12
See application file for complete search history.

(56) References Cited

U.S. PATENT DOCUMENTS

| 5,895,999 | A * | 4/1999 | Okaguchi et al. | 310/367 |
|---|---|---|---|---|
| 5,932,804 | A * | 8/1999 | Hopkin et al. | 73/504.13 |
| 6,151,964 | A * | 11/2000 | Nakajima | 73/504.13 |
| 6,276,205 | B1 * | 8/2001 | McNie et al. | 73/504.13 |
| 6,343,509 | B1 * | 2/2002 | Fell et al. | 73/504.13 |
| 6,640,630 | B1 * | 11/2003 | de Salaberry | 73/504.13 |
| 6,883,374 | B2 * | 4/2005 | Fell et al. | 73/504.13 |
| 6,901,799 | B2 * | 6/2005 | Chen et al. | 73/504.13 |
| 6,978,674 | B2 * | 12/2005 | Fell et al. | 73/504.13 |
| 7,040,162 | B2 * | 5/2006 | Lehureau et al. | 73/504.12 |
| 7,404,325 | B2 * | 7/2008 | Delevoye | 73/504.13 |
| 7,513,156 | B2 * | 4/2009 | Chikovani et al. | 73/504.13 |
| 2007/0062282 | A1 * | 3/2007 | Akashi et al. | 73/504.12 |
| 2008/0264168 | A1 * | 10/2008 | Stewart | 73/504.13 |
| 2009/0320593 | A1 * | 12/2009 | Nakashio et al. | 73/504.15 |

FOREIGN PATENT DOCUMENTS

EP          751375 A2 *  1/1997

\* cited by examiner

*Primary Examiner* — Hezron Williams
*Assistant Examiner* — Samir M Shah
(74) *Attorney, Agent, or Firm* — Rosenberg, Klein & Lee

(57) ABSTRACT

The present invention relates to a multiaxial gyroscope, which comprises a vibration-sensing device, a plurality of elastic connecting parts, a first substrate, and a plurality of electrodes. The first ends of the elastic connecting parts are adapted on the periphery of the vibration-sensing device. The sidewall of the first substrate connects with the second ends of the elastic connecting parts. The plurality of electrodes is located on the periphery of the vibration-sensing device and is opposite to the plurality of elastic connecting parts. The vibration-sensing device comprises a ring and a plurality of vibration blocks. By means of the vibration blocks, the sensing area as well as the driving amplitude of the gyroscope can be increased effectively. Thereby, the intensity of the sensed signals of the gyroscope can be enhanced.

12 Claims, 16 Drawing Sheets

MULTIAXIAL GYROSCOPE

FIELD OF THE INVENTION

The present invention related generally to a multiaxial gyroscope, and particularly to a multiaxial gyroscope capable of enhancing the intensity of the sensed signals.

BACKGROUND OF THE INVENTION

FIG. 1 shows a structural schematic diagram of a vibrating ring gyroscope according to the prior art. As shown in the figure, the vibrating ring gyroscope according to the prior art comprises a driving structure, which includes a ring 10, which is a conductor, a plurality of sensing electrodes 20 set above or below the ring 10, and a plurality of driving electrodes 30 set on the outer side of the ring 10 and corresponding to the sensing electrodes 20. The ring 10 and the driving electrodes are connected to a voltage source, respectively, and thereby have a voltage difference therebetween. Accordingly, when the ring 10 and the driving electrodes 30 are electrified, they will attract each other, and hence the ring 10 will be stretched and deformed.

FIG. 1B shows a motion schematic diagram of FIG. 1A. As shown in the figure, when the ring 10 and A- and C-driving electrodes 30 are electrified, because the ring 10 and the driving electrodes 30 attract each other, the ring 10 will stretch towards the directions of the points A and C. Thereby, the points B and D will move towards the center of the ring 10. If the vibrating ring gyroscope rotates about the axis formed by the line connecting the points A and C, each point on the ring 10 will experience a Coriolis force $F_C$, which is equal to $m \cdot V \times \Omega$, namely, $2\, mV\Omega \sin\theta$, where m is the mass of the point under force, V is the velocity of the point under force, $\Omega$ is the directional vector of rotation of the point under force, and $\theta$ is the angle between the vectors V and $\Omega$. Because the vibrating ring gyroscope rotates about the axis formed by the line connecting the points A and C, the direction of the vector $\Omega$ is the direction of the line connecting the points A and C, namely, the direction of X-axis.

FIG. 1C shows a driving-mode curve of a vibrating ring gyroscope according to the prior art. When the ring 10 and the A- and C-driving electrodes 30 are electrified, the velocity of the point A is V, the velocity of the point B is $-V$, the velocity of the point C is $-V$, and the velocity of the point D is V. Thereby, the curve shows a $\cos 2\psi$ pattern. Accordingly, the driving mode of the vibrating ring gyroscope is $\cos 2\psi$.

FIG. 1D shows a sensing-mode curve of a vibrating ring gyroscope according to the prior art. According to the above description, it is known that the points A and C are free from the Coriolis force because the $\theta$ angle between the velocity and angular velocity is zero. On the other hand, the points B and D will experience a downward and an upward Coriolis force, respectively. The amplitude of the force $F_C$ experienced by the points on the ring 10 is shown as the curve in FIG. 1D. In FIG. 1D, a $\sin \psi$ curve is shown. Thereby, when the ring 10 and the A- and C-driving electrodes 30 are electrified, the sensing mode of the vibrating ring gyroscope is $\sin \psi$.

Likewise, if the ring 10 and the B- and D-driving electrodes 30 are electrified, the vibrating ring gyroscope rotates about the axis formed by the line connecting the points B and D. Thereby, the directional vector of $\Omega$ is the direction of the line connecting the points B and D. In addition, the sensing mode of the vibrating ring gyroscope is $\cos \psi$. Accordingly, the vibrating ring gyroscope according to the prior art adopts out-of-plane $\cos \psi$ and $\sin \psi$ resonance mode to measure the angular velocity of X-Y-axes. However, because the sensed signals are limited by the area of the bulk of the resonance ring of the gyroscope, the intensity of the sensed signals cannot be increased effectively.

FIGS. 2A and 2B show a structural and a motion schematic diagram of a vibrating ring gyroscope according to the U.S. Pat. No. 6,343,509, which adopts out-of-plane $\cos 3\psi$ and $\sin 3\psi$ resonance mode to measure the angular velocity of X-Y-axes. However, because the amplitude of the $3\psi$-mode is smaller than that of $\psi$- and $2\psi$-mode, the intensity of the sensed signals cannot be increased effectively.

Accordingly, the present invention provides a sensing structure for a multiaxial gyroscope, which can increase effectively the sensing area as well as the sensing mass of the gyroscope, so that the driving amplitude is increased accordingly. Thereby, the intensity of the sending signal can be increased effectively. In addition, the $\cos \psi$ and $\sin \psi$ resonance mode adopted by the present invention can increase the driving amplitude. Hence, the problems described above can be solved.

SUMMARY

An objective of the present invention is to provide a multiaxial gyroscope. By setting a plurality of vibration blocks on the inner sidewall of a ring of a vibration-sensing device, the effective sensing side area of a driven gyroscope can be increased. In addition, by using the vibration blocks, the sensing mass can be increased as well, which in turn increases the Coriolis force and thereby the driving amplitude of the gyroscope. Hence, the intensity of the sensed signals of the gyroscope can be enhanced.

Another objective of the present invention is to provide a multiaxial gyroscope, which can increase the stretching range of the ring by means of a plurality of elastic connecting parts. Hence, the intensity of the sensed signals of the gyroscope can be enhanced.

Still another objective of the present invention is to provide a sensing structure of a multiaxial gyroscope, which can increase the vibrating amplitude of the vibration blocks by means of a plurality of first connecting parts. Hence, the intensity of the sensed signals of the gyroscope can be enhanced.

The present invention relates to a multiaxial gyroscope, which comprises a vibration-sensing device, a plurality of elastic connecting parts, a first substrate, and a plurality of electrodes. The first ends of the elastic connecting parts are adapted on the periphery of the vibration-sensing device. The sidewall of the first substrate connects with the second ends of the elastic connecting parts. The plurality of electrodes is located on the periphery of the vibration-sensing device and is opposite to the plurality of elastic connecting parts. The vibration-sensing device comprises a ring and a plurality of vibration blocks. The plurality of vibration blocks is adapted on the inner sidewall of the ring. The first ends of the elastic connecting parts are adapted on the outer sidewall of the ring. The elastic connecting parts are opposite to the vibration blocks. The second ends of the elastic connecting parts are adapted on the sidewall of the first substrate with holes therethrough. By means of the vibration blocks, the sensing area as well as the driving amplitude of the gyroscope can be increased effectively. Thereby, the intensity of the sensed signals of the gyroscope can be enhanced.

The present invention further comprises a plurality of elastic connecting parts, which is connected between the outer sidewall of the ring and the first substrate. Thereby, the stretching range of the range is increased, and the intensity of the sensed signals of the gyroscope can be enhanced.

The present invention further comprises a plurality of first connecting parts, which is connected between the inner sidewall of the ring and the vibration blocks. Thereby, the vibrating amplitude of the vibration blocks can be increased, and the intensity of the sensed signals of the gyroscope can be enhanced.

DETAILED DESCRIPTION

In order to make the structure and characteristics as well as the effectiveness of the present invention to be further understood and recognized, the detailed description of the present invention is provided as follows along with preferred embodiments and accompanying figures.

Figure 1A:
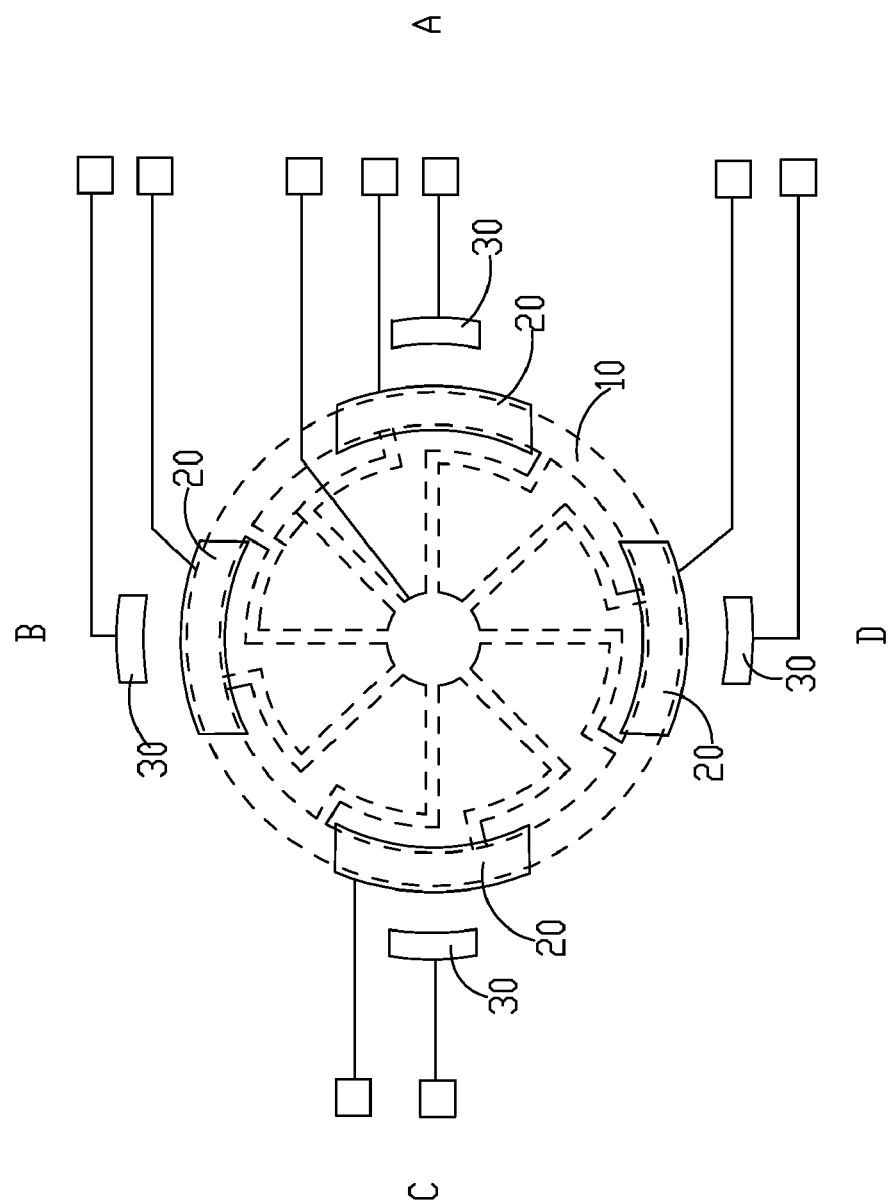
FIG. 1A shows a structural schematic diagram of a vibrating ring gyroscope according to the prior art.
Figure 1B:
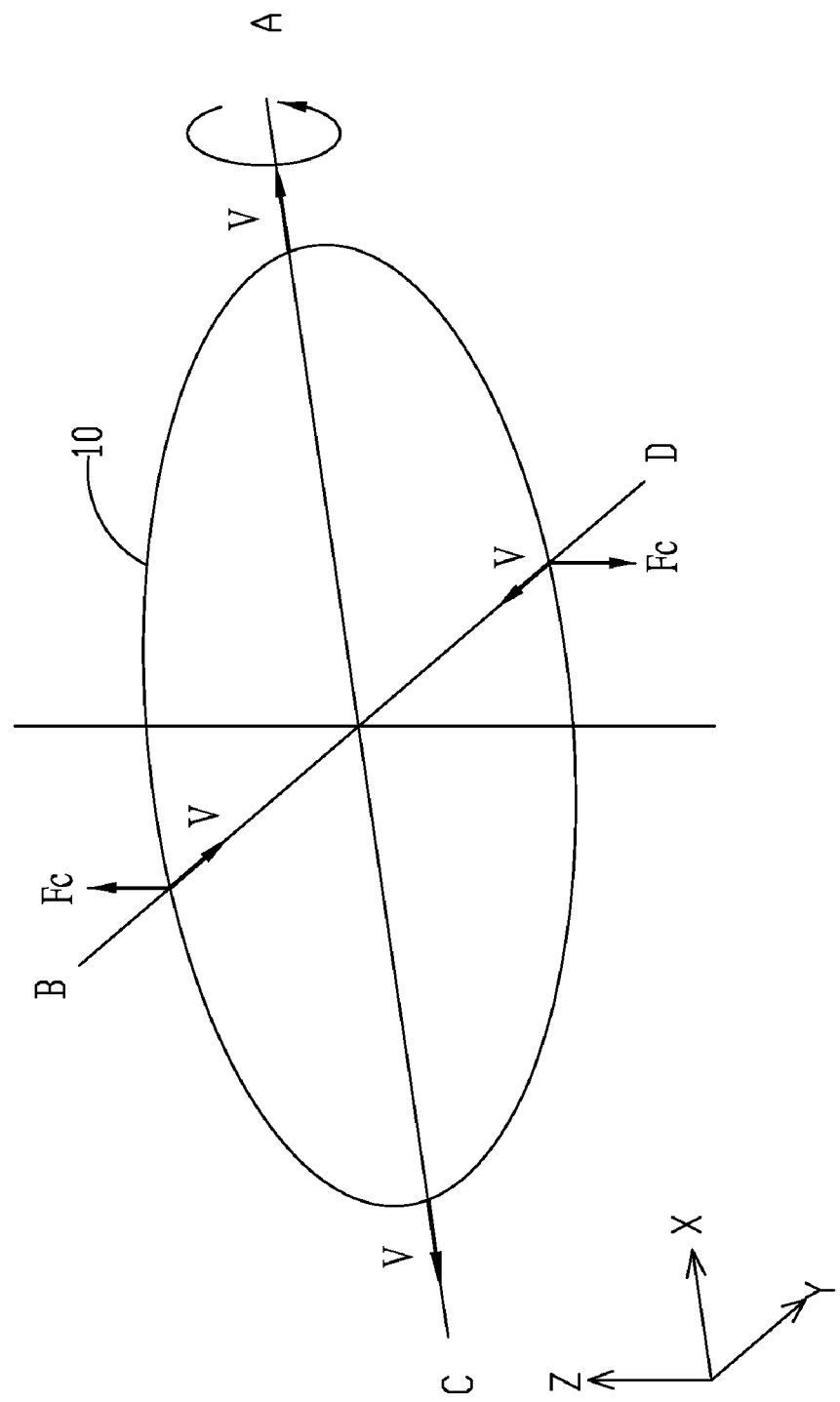
FIG. 1B shows a motion schematic diagram of FIG. 1A.
Figure 1C:
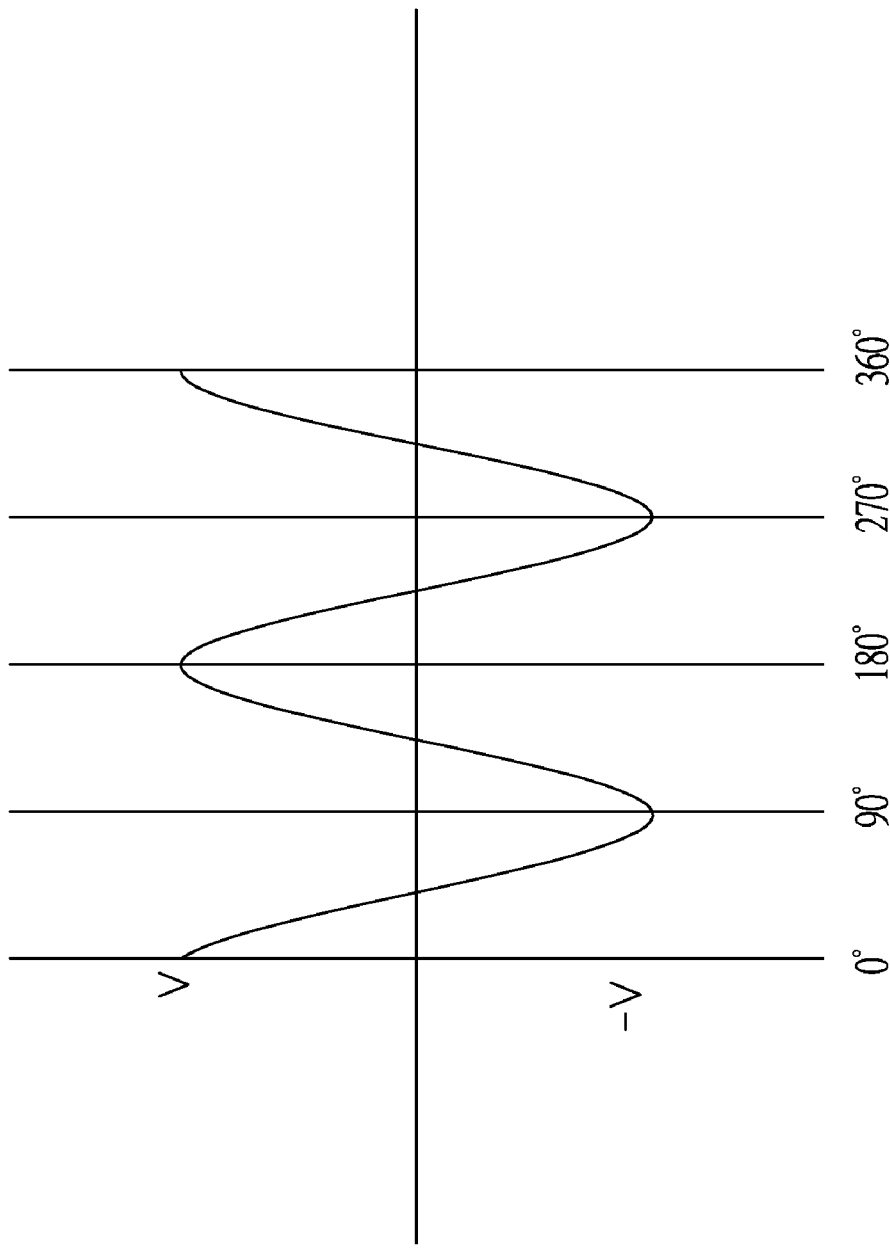
FIG. 1C shows a driving-mode curve of a vibrating ring gyroscope according to the prior art.
Figure 1D:
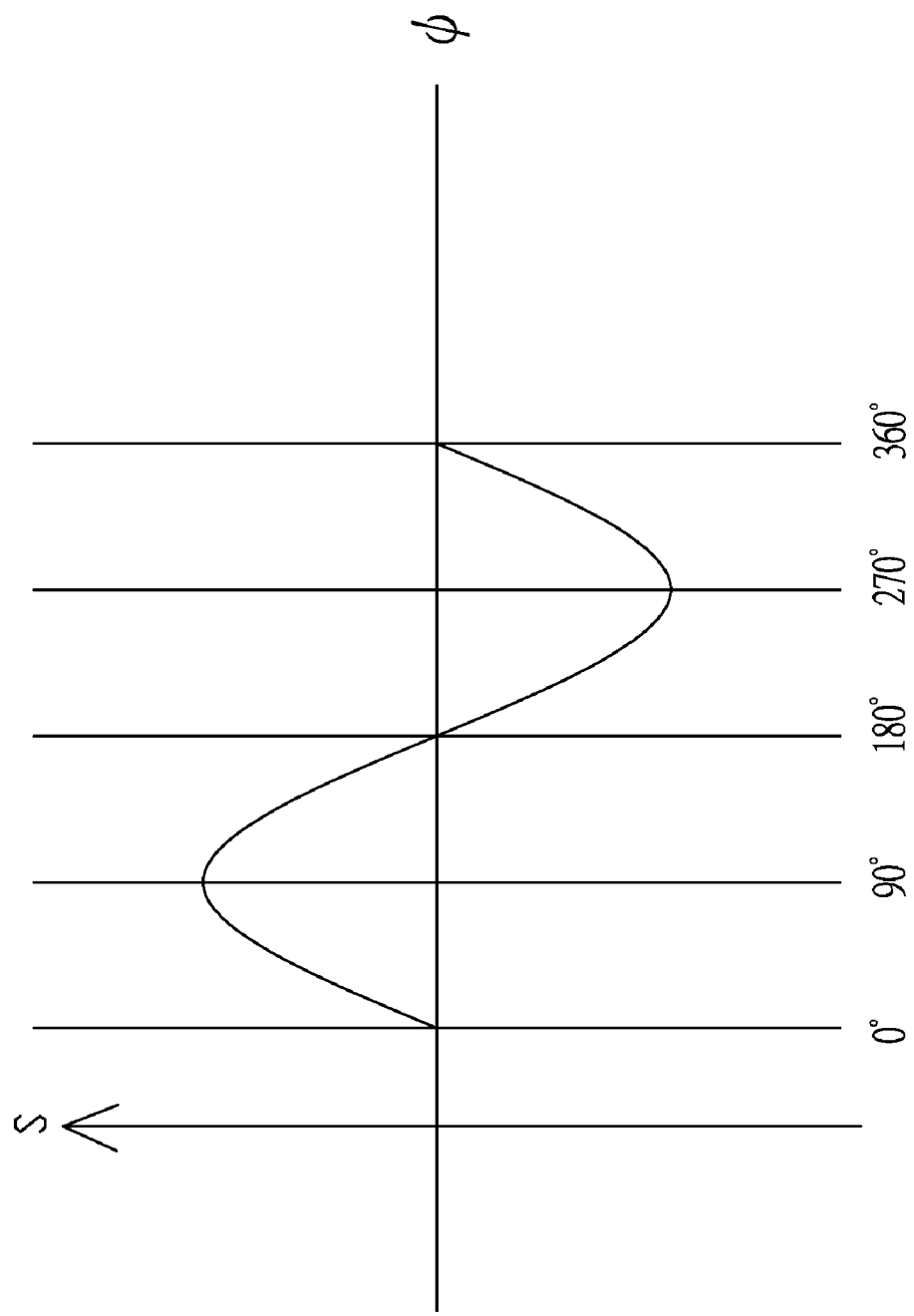
FIG. 1D shows a sensing-mode curve of a vibrating ring gyroscope according to the prior art.
Figure 2A:
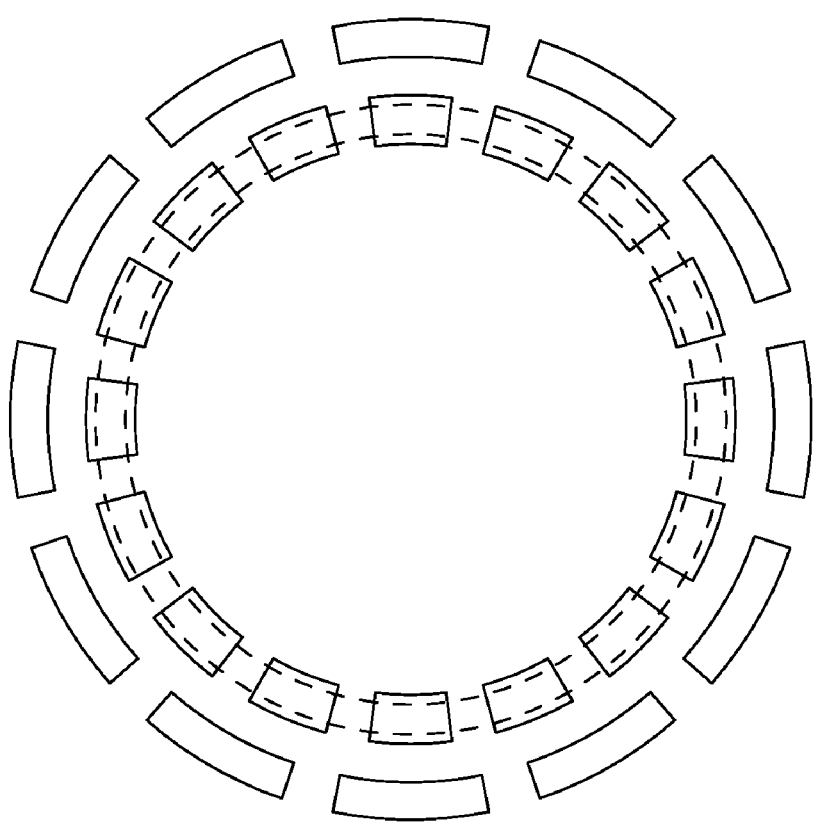
FIG. 2A shows a structural schematic diagram of a vibrating ring gyroscope according to the prior art.
Figure 2B:
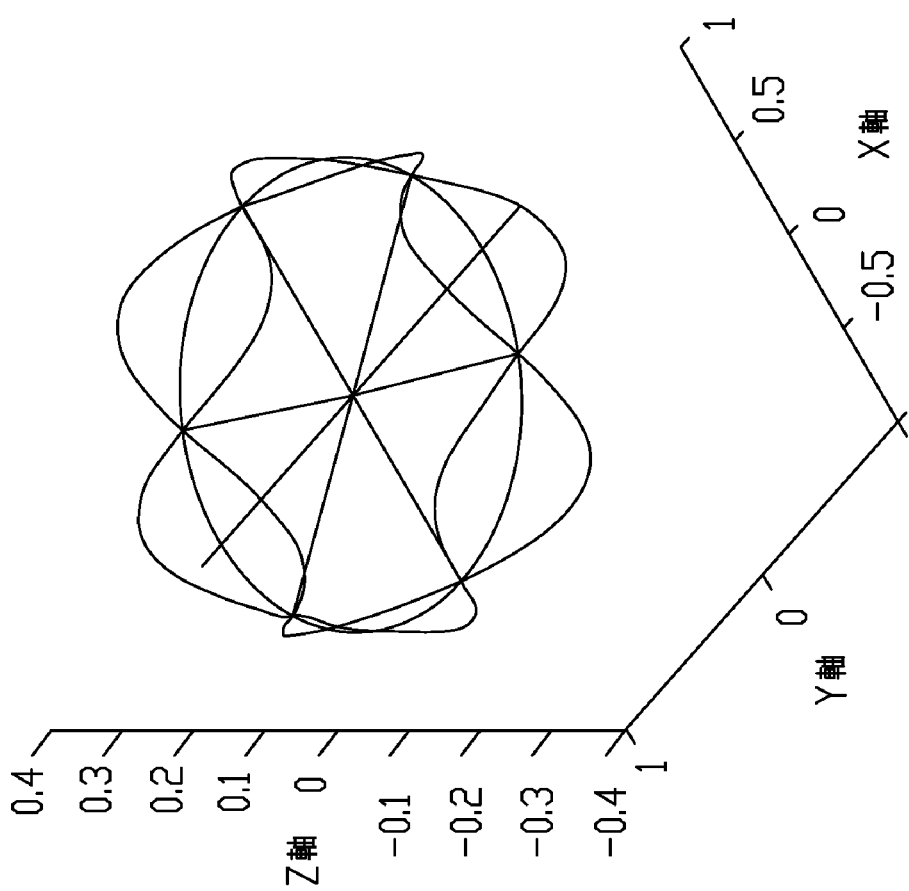
FIG. 2B shows a motion schematic diagram of a vibrating ring gyroscope according to the prior art.
Figure 3:
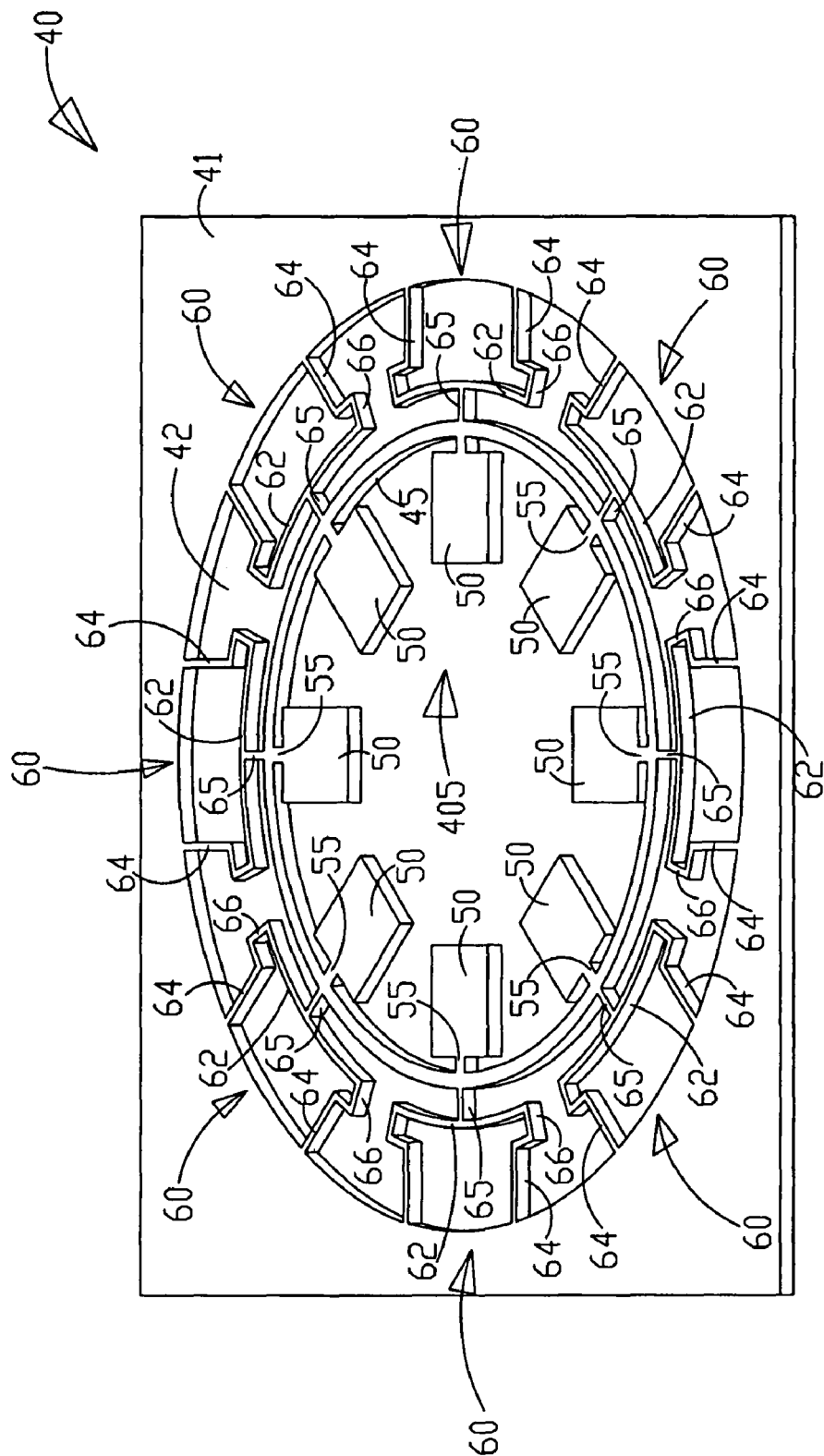
FIG. 3 shows a structural schematic diagram according to a preferred embodiment of the present invention.

FIG. 3 shows a structural schematic diagram according to a preferred embodiment of the present invention. As shown in the figure, the sensing structure 40 of the multiaxial gyroscope according to the present invention comprises a vibration-sensing device 405, a plurality of elastic connecting parts 60, and a first substrate 41. The first ends of the elastic connecting parts 60 are adapted on the periphery of the vibration-sensing device 405. The sidewall of the first substrate 41 connects with the second ends of the elastic connecting parts 60. The vibration-sensing device 405 comprises a ring 45 and a plurality of vibration blocks 50. The plurality of vibration blocks 50 is adapted on the inner sidewall of the ring 45. The first ends of the elastic connecting parts 60 are adapted on the outer sidewall of the ring 45. The elastic connecting parts 60 are opposite to the vibration blocks 50.

The first substrate 41 has holes 42. The second ends of the elastic connecting parts 60 are set on the sidewall of the holes 42. By setting a plurality of vibration blocks 50 on the inner sidewall of the ring 45, the effective sensing side area of the driven gyroscope can be increased. In addition, by using the vibration blocks 50, the sensing mass can be increased as well, which in turn increases the Coriolis force and thereby the driving amplitude of the gyroscope. Hence, the intensity of the sensed signals of the gyroscope can be enhanced.

The present invention further comprises a plurality of first connecting parts 55 and a plurality of second connecting parts 65. Both ends of the first connecting part 55 are connected to the inner sidewall of the ring 45 and the vibration block, respectively. The first connecting part 55, the inner sidewall of the ring 45, and the vibration block 50 are formed integrally. Both ends of the second connecting part 65 are connected to the outer sidewall of the ring 45 and the first end of the elastic connecting part 60, respectively. The second connecting part 65, the outer sidewall of the ring 45, and the elastic connecting part 60 are formed integrally.

The elastic connecting part 60 comprises an elastic arm 62, a connecting arm 64, and a bended member 66. The elastic arm 62 is opposite laterally to the vibration block 50. The elastic arm 62 communicates with the second connecting part 65. The connecting arm 64 is connected to both ends of the elastic arm 62 and the inner sidewall of the hole 42. Both ends of the bended member 66 are connected to the elastic arm 62 and the connecting arm 64. Thereby, when the vibration blocks 50 vibrate, by means of the first connecting parts 55, the vibrating amplitude of the vibration blocks 50 is increased, enhancing effectively the intensity of the sensed signals. Besides, when the ring 45 is stretched outwards, by means of the elastic arms 62, the stretching range of the ring 45 is increased, enhancing the intensity of the sensed signals as well.

Figure 4A:
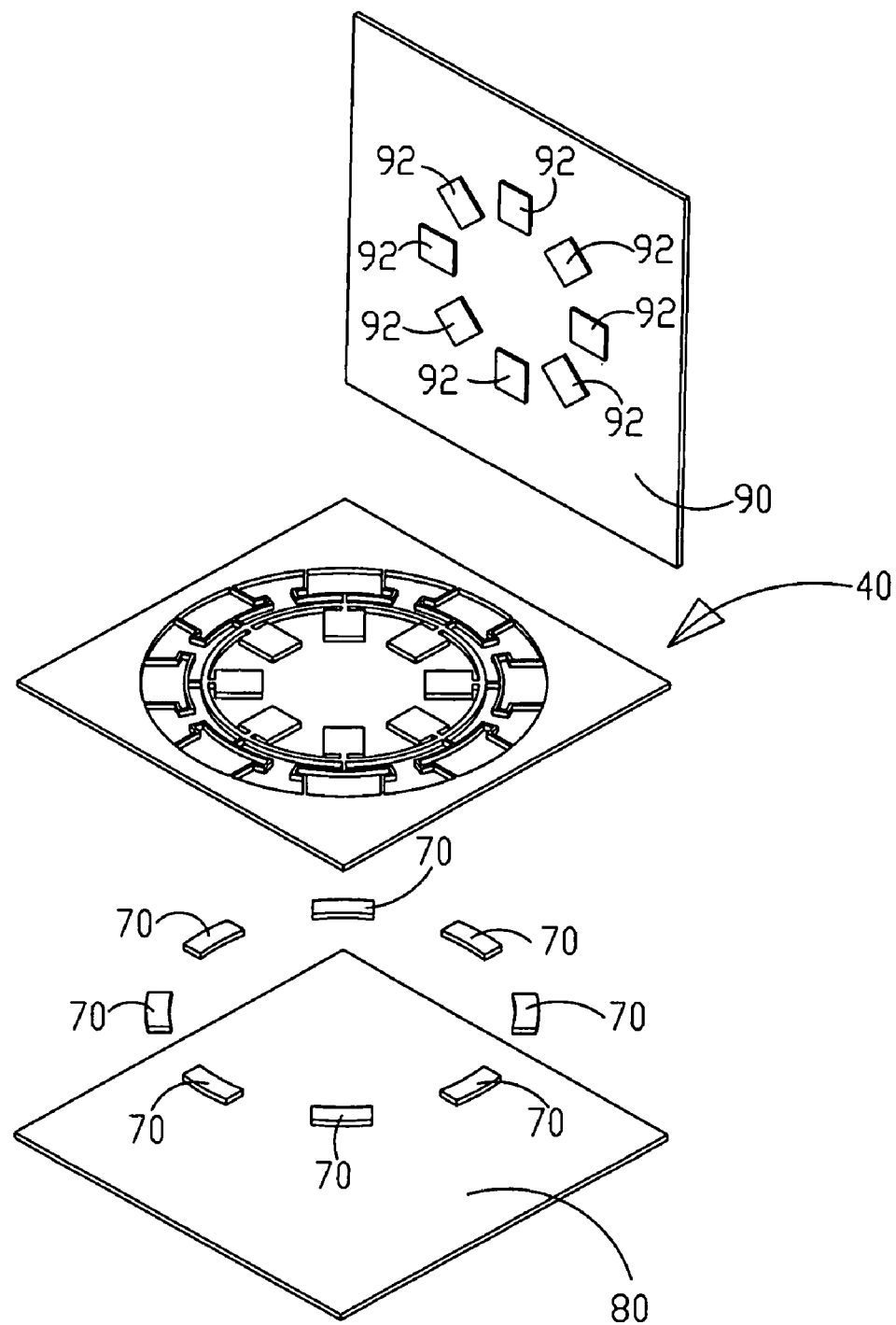
FIG. 4A shows a structural schematic diagram of the multiaxial gyroscope according to a preferred embodiment of the present invention.
Figure 4B:
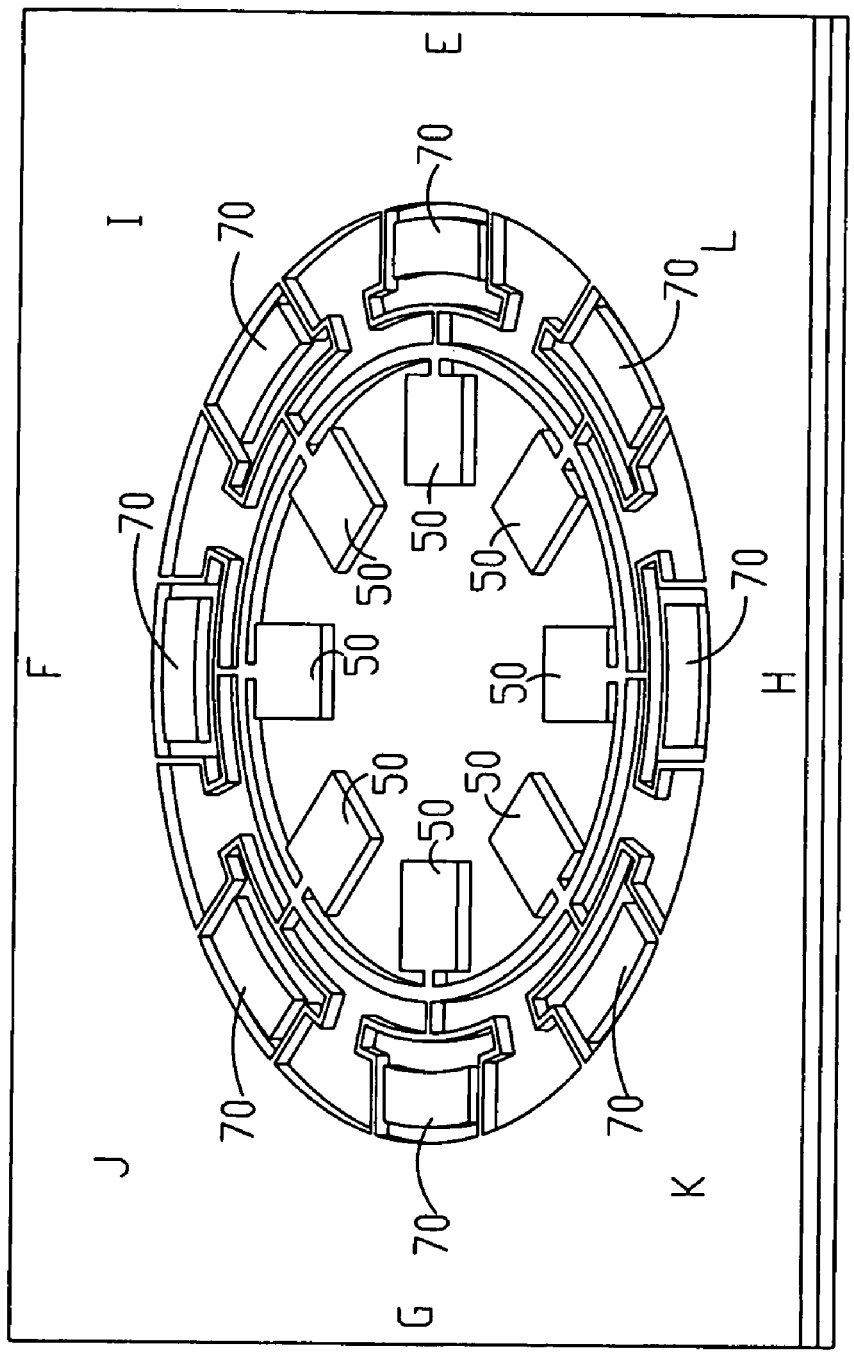
FIG. 4B shows a schematic diagram of the electrodes and sensing structures set on a second electrode of the multiaxial gyroscope according to a preferred embodiment of the present invention.

FIGS. 4A and 4B show a structural schematic diagram of the multiaxial gyroscope and a schematic diagram of the electrodes and sensing structures set on a second electrode of the multiaxial gyroscope according to a preferred embodiment of the present invention. As shown in the figures, the multiaxial gyroscope according to the present invention includes a second substrate 80, a plurality of electrodes 70, a sensing structure 40, and a third substrate 90. The plurality of electrodes 70 is adapted on the second substrate 80, and each of the electrodes 70 is located in each of the elastic connecting parts 60. The third substrate 90 is adapted on the sensing structure 40. A plurality of sensors 92 is adapted below the third substrate 90. The sensors 92 are opposite to the vibration blocks 50, and are used for sensing vibration of the vibration blocks 50.

There exists a potential difference between the plurality of electrodes 70 and the sensing structure 40. Thereby, when the plurality of electrodes 70 and the sensing structure 40 are electrified, the ring 45 will be stretched towards the direction of the electrodes 70. For example, when the sensing structure 40 is grounded and the electrodes 70 are connected to a voltage, a potential difference exists between the plurality of electrodes 70 and the sensing structure 40 and makes the electrodes 70 and the ring 45 attract each other. Hence, the ring 45 stretches outwards. However, because the sensing structure 40 a conductor or a semiconductor formed integrally, the electrodes 70 and the elastic arm 62 attract each other as well. Besides, the electrodes 70 have the function of controlling the ring 45. When the ring 45 is stretched owing to the electrodes 70 and then unelectrified, the ring 45 more or less deforms. Thereby, the electrodes 70 can be used for controlling the shape of the ring 45, and for recovering the ring 45 back to a circle. Accordingly, the accuracy of the gyroscope is improved.

Figure 5A:
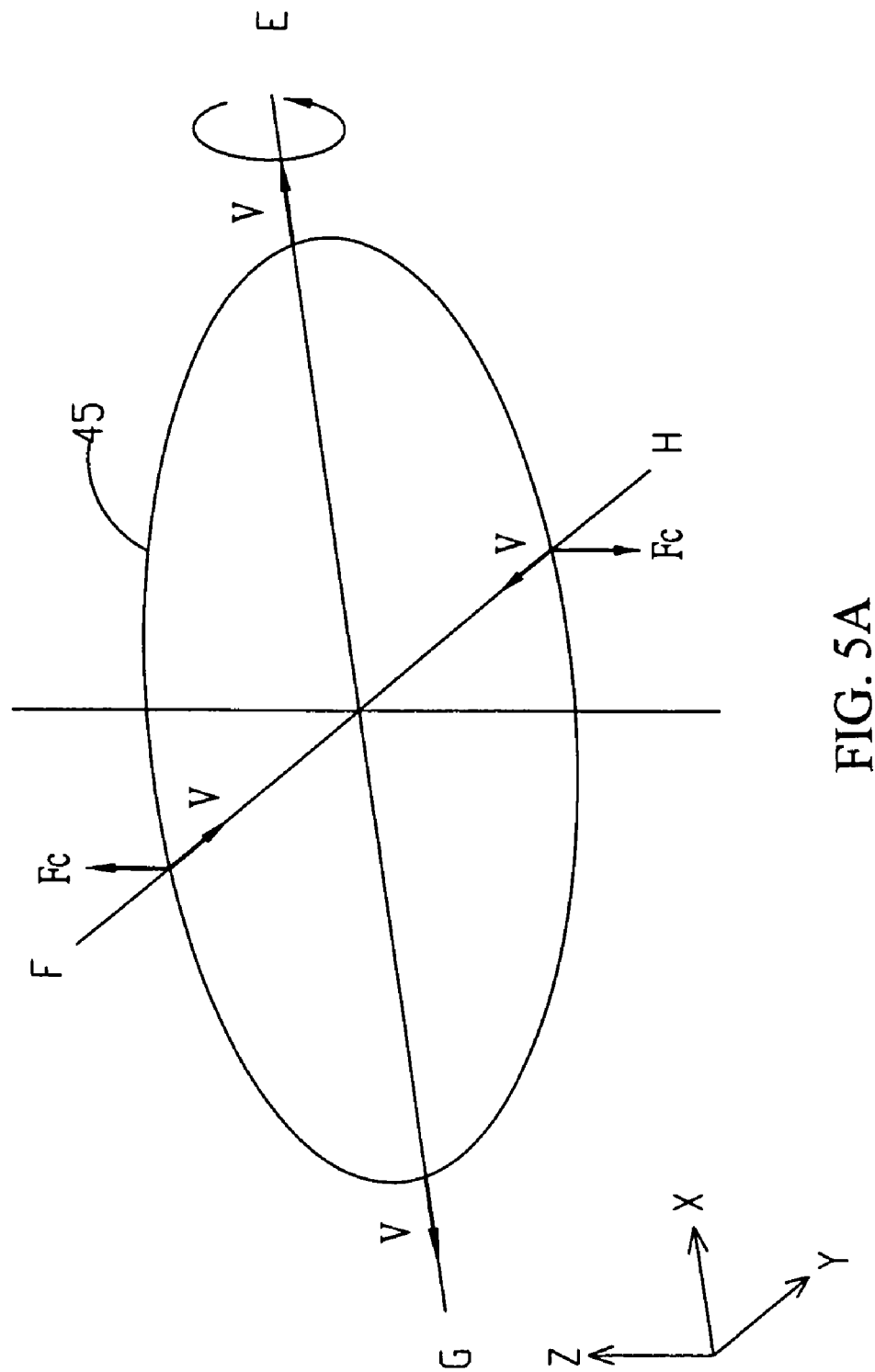
FIG. 5A shows a motion schematic diagram of the ring according to a preferred embodiment of the present invention.
Figure 5B:
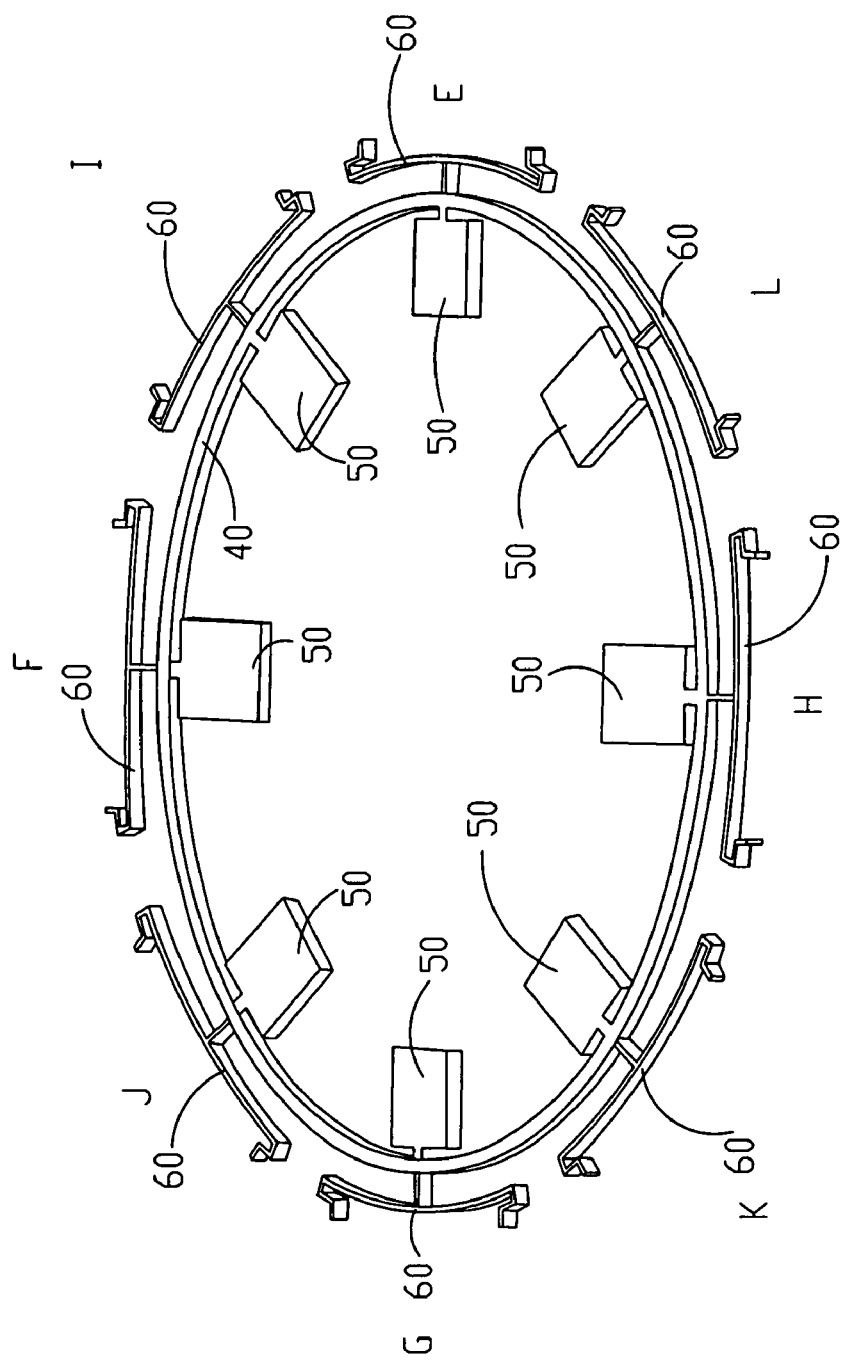
FIG. 5B shows a three-dimensional view of the ring according to a preferred embodiment of the present invention.

FIGS. 5A and 5B show a motion schematic diagram and a three-dimensional view of the ring according to a preferred embodiment of the present invention. As shown in the figures, when the E- and G-electrodes 70 are electrified, the ring 45 will stretch towards the directions of E and G at the velocity of V, and will stretch towards the center at the velocity of V. At this moment, if the ring 45 rotates about the axis formed by the points G and E and has an angular velocity ω in the E-direction, the ring 45 will experience a upward and a downward centripetal force $F_C$ at the points F and H, respectively. $F_C$ is equal to m·V×Ω, namely, 2 mVΩ Sin θ, where m is the mass of the point under force, V is the velocity of the point under force, Ω is the directional vector of rotation of the point under force, and θ is the angle between the vectors V and Ω.

Thereby, the points on the ring 45 at the locations E and G will not move, while the points on the ring 45 at the locations F and H will move upwards and downwards, respectively. However, the plurality of vibration blocks 50 is adapted on the inner sidewall of the ring 45. Accordingly, movement at the F and H locations moves the vibration blocks 50. Hence, the vibrations blocks 50 at the locations F and H will move upwards and downwards, respectively. By means of the movement of the vibration blocks 50, the sensing area as well as the driving amplitude of the driven gyroscope can be increased effectively. Thereby, the intensity of the sensed signal while driving a gyroscope can be enhanced.

In addition, the vibrating directions of the vibration blocks 50 at the locations J and K are up and down, respectively. The amplitude of the vibration block 50 at the location J is between those at the locations G and F; the amplitude of the vibration block 50 at the location K is between those at the locations G and H. Likewise, the vibrating directions of the vibration blocks 50 at the locations L and I are up and down, respectively. The amplitude of the vibration block 50 at the location L is between those at the locations H and E; the amplitude of the vibration block 50 at the location I is between those at the locations E and H.

Figure 5C:
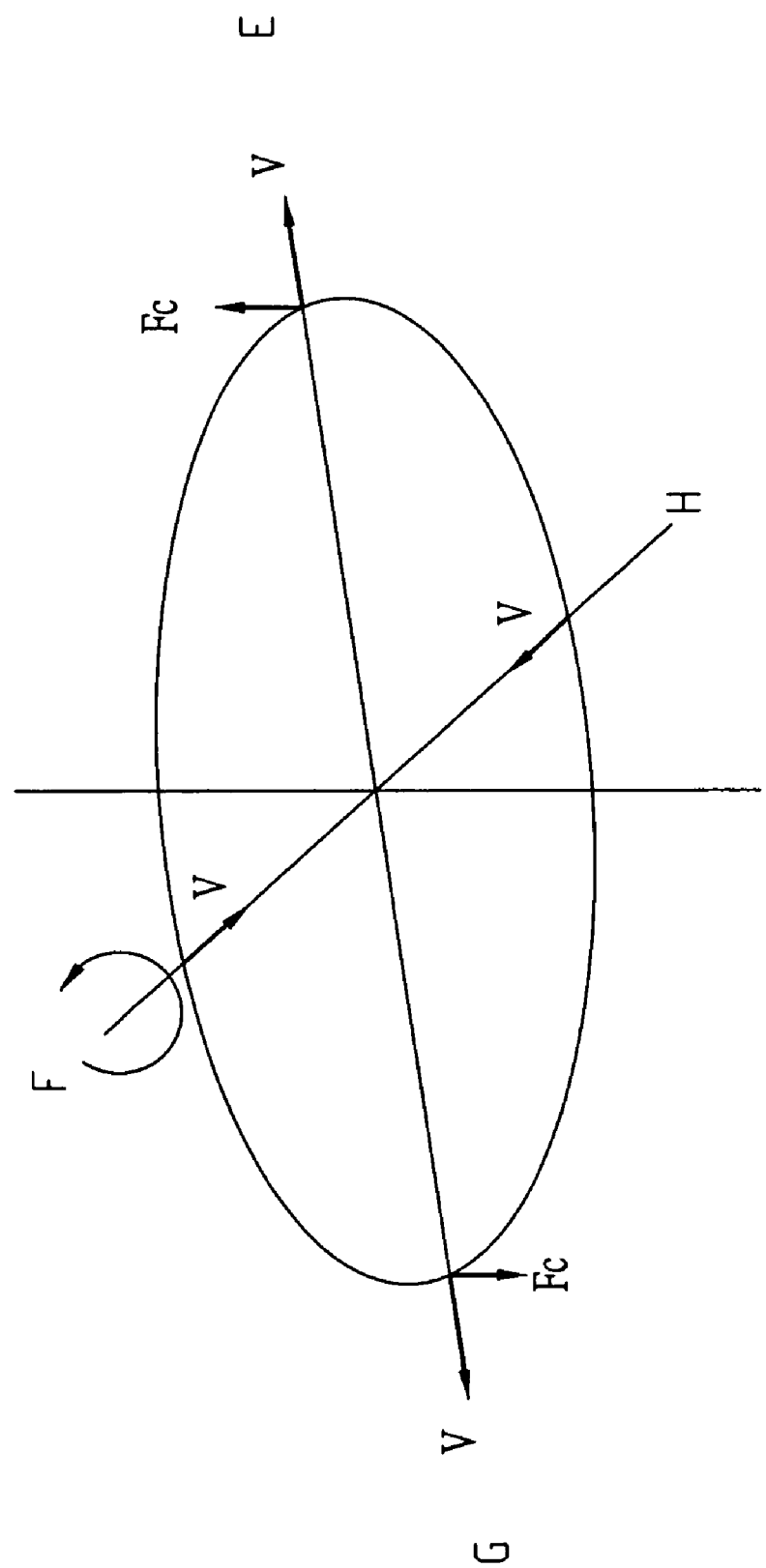
FIG. 5C shows another motion schematic diagram of the ring according to a preferred embodiment of the present invention.
Figure 5D:
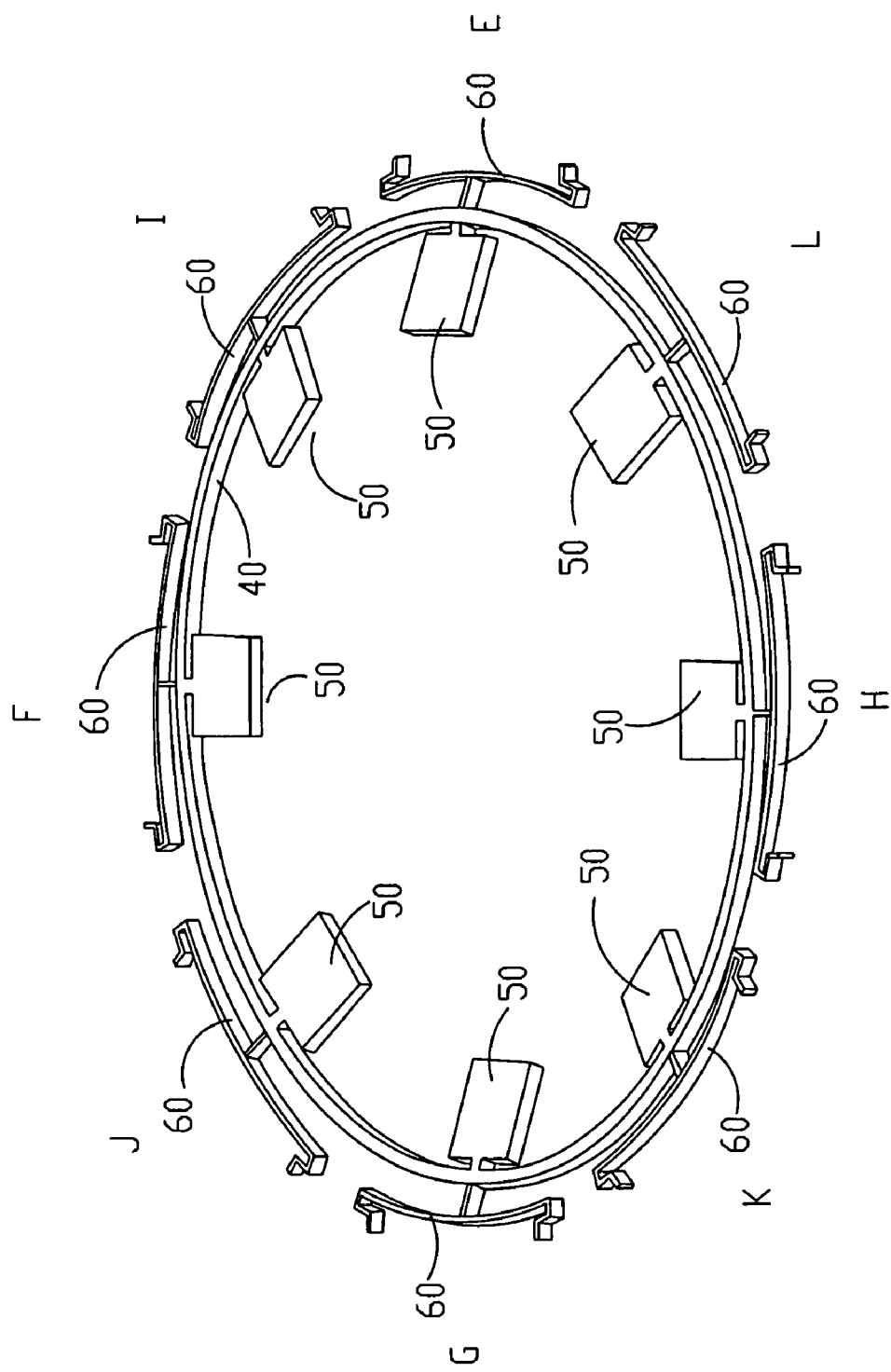
FIG. 5D shows another three-dimensional view of the ring according to a preferred embodiment of the present invention.

FIGS. 5C and 5D show another motion schematic diagram and another three-dimensional view of the ring according to a preferred embodiment of the present invention. Similarly, if the electrodes 70 at the directions of F and H are electrified, the ring 45 will stretch in the directions of F and H as well. Thereby, the vibrations blocks 50 at the locations E and G will move upwards and downwards, respectively. Besides, the vibrating directions of the vibration blocks 50 at the locations I and J are up and down, respectively. The amplitude of the vibration block 50 at the location I is between those at the locations E and F; the amplitude of the vibration block 50 at the location J is between those at the locations F and G. Likewise, the vibrating directions of the vibration blocks 50 at the locations K and L are up and down, respectively. The amplitude of the vibration block 50 at the location K is between those at the locations G and H; the amplitude of the vibration block 50 at the location L is between those at the locations H and E.

The preferred embodiment described above adopts eight vibration blocks 50 for description. The number of the vibration blocks 50 can be reduced to four or be increase to twelve depending on users' demands. Besides, the number of electrodes 70 corresponds to the number of the vibration blocks 50. Thereby, by means of the vibration blocks 50, the intensity of the sensed signals of a driven gyroscope can be increased.

Figure 6:
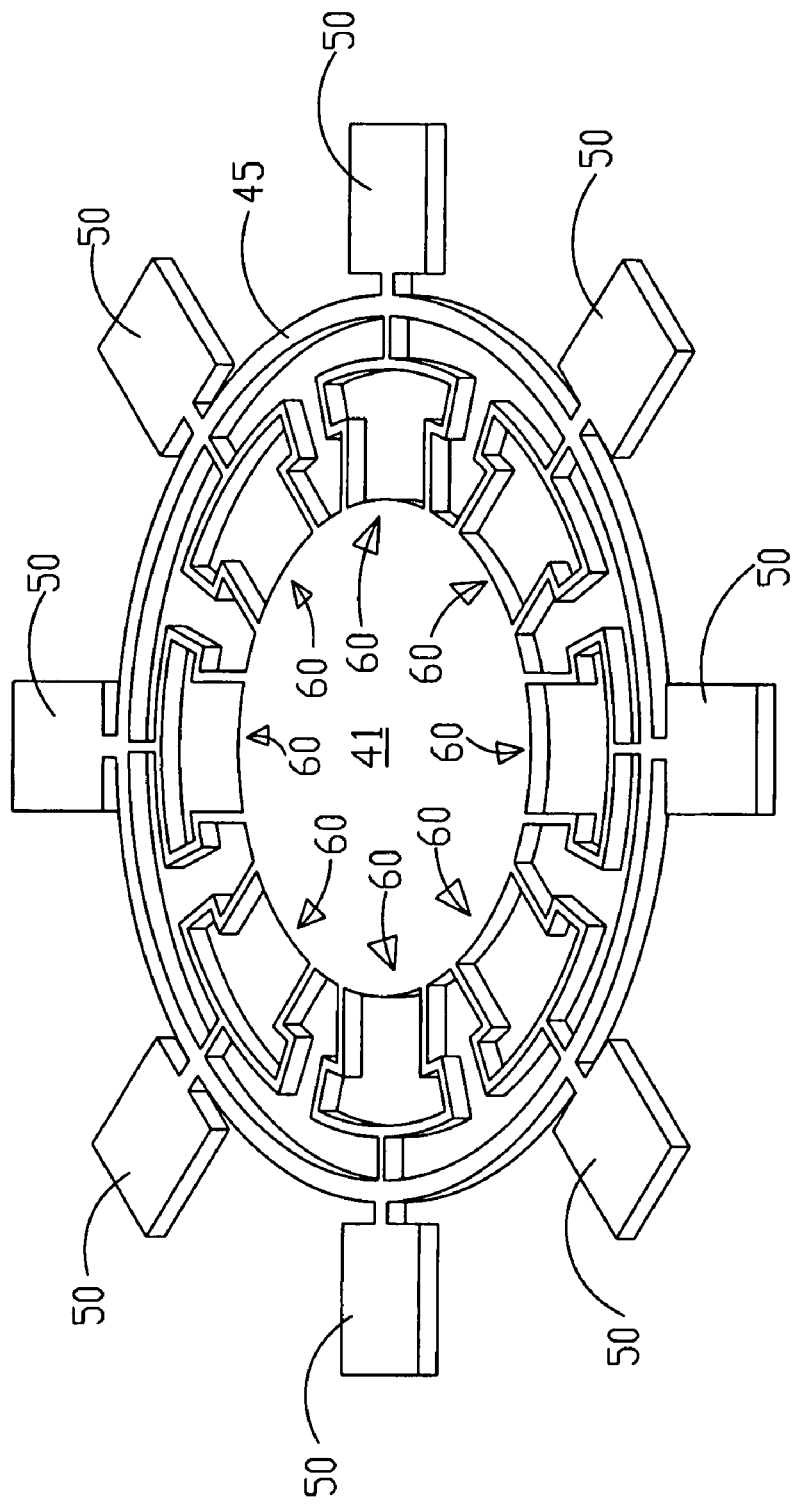
FIG. 6 shows another structural schematic diagram according to another preferred embodiment of the present invention.

FIG. 6 shows another structural schematic diagram according to another preferred embodiment of the present invention. As shown in the figure, the difference between the present preferred embodiment and the previous one is that in the previous preferred embodiment, the vibration blocks 50 are set on the inner sidewall of the ring 45, and the plurality of elastic connecting parts 60 is set on the outer sidewall of the ring 45. According to the present preferred embodiment, the vibration blocks 50 are set on the outer sidewall of the ring 45, while the plurality of elastic connecting parts 60 is set on the inner sidewall of the ring 45. In addition, the second ends of the elastic connecting parts 60 connect with the sidewall of the first substrate 40.

Figure 7A:
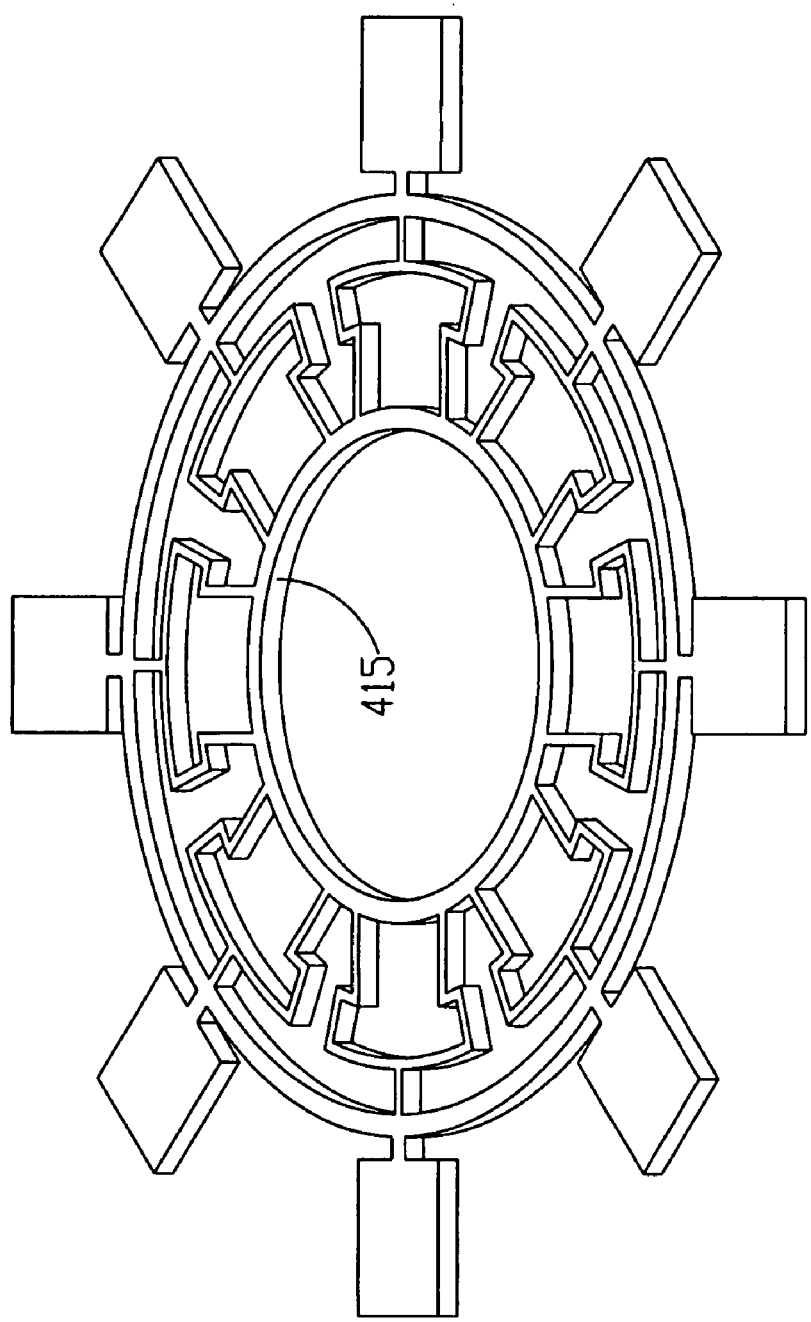
FIG. 7A shows another structural schematic diagram according to another preferred embodiment of the present invention.

FIG. 7A shows another structural schematic diagram according to another preferred embodiment of the present invention. As shown in the figure, the difference between the present preferred embodiment and the previous one is that in the previous preferred embodiment, the second ends of the elastic connecting parts 60 connect with the sidewall of the first substrate 40. According to the present preferred embodiment, the second ends of the elastic connecting parts 60 connect with a securing ring 415.

Figure 7B:
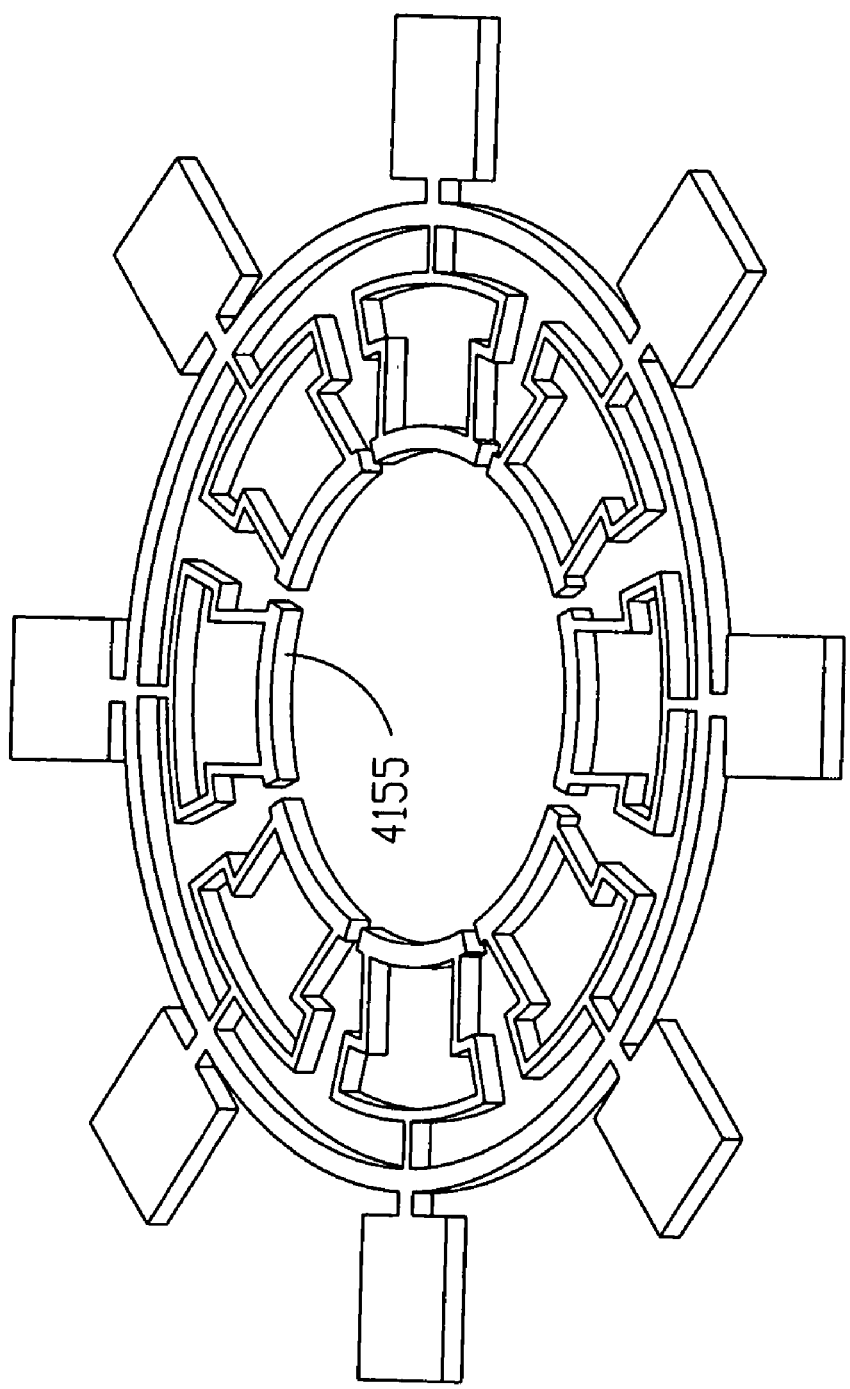
FIG. 7B shows another structural schematic diagram according to another preferred embodiment of the present invention.

FIG. 7B shows another structural schematic diagram according to another preferred embodiment of the present invention. As shown in the figure, the difference between the present preferred embodiment and the previous one is that in the previous preferred embodiment, the second ends of the elastic connecting parts 60 connect with a securing ring 415. According to the present preferred embodiment, the securing ring 415 comprises a plurality of securing members 4155, and the second ends of the elastic connecting parts 60 connect with the securing members 4155.

To sum up, the multiaxial gyroscope according to the present invention comprises a vibration-sensing device, a plurality of elastic connecting parts, a first substrate, and a plurality of electrodes. The first ends of the elastic connecting parts are adapted on the periphery of the vibration-sensing device. The sidewall of the first substrate connects with the second ends of the elastic connecting parts. The plurality of electrodes is located on the periphery of the vibration-sensing device and is opposite to the plurality of elastic connecting parts. The vibration-sensing device comprises a ring and a plurality of vibration blocks. By means of the vibration blocks, the sensing area as well as the driving amplitude of the gyroscope can be increased effectively. Thereby, the intensity of the sensed signals of the gyroscope can be enhanced.

Accordingly, the present invention conforms to the legal requirements owing to its novelty, non-obviousness, and utility. However, the foregoing description is only a preferred embodiment of the present invention, not used to limit the scope and range of the present invention. Those equivalent changes or modifications made according to the shape, structure, feature, or spirit described in the claims of the present invention are included in the appended claims of the present invention.

The invention claimed is:
1. A multiaxial gyroscope, comprising:
a vibration-sensing device, the vibration device including a ring and a plurality of vibration blocks set on an inner sidewall of the ring;
a plurality of elastic connecting parts, having first and second ends, the first ends of the plurality of elastic connecting parts being connected with an outer sidewall of the ring of the vibration-sensing device, the plurality of elastic connecting parts being disposed opposite to the plurality of vibration blocks; and a plurality of electrodes set on a periphery of the vibration-sensing device and respectively disposed in correspondence with the plurality of elastic connecting parts, and a potential difference existing between the vibration-sensing device and the electrodes.

2. The multiaxial gyroscope of claim 1, and further comprising:
a plurality of first connecting parts, and both ends thereof connecting to the inner sidewall of the ring and the vibration blocks, respectively;
a plurality of second connecting parts, and both ends thereof connecting to the outer sidewall of the ring and the first ends of the elastic connecting parts, respectively;
an elastic arm, laterally opposite to the vibration blocks, and connecting with the second connecting parts;
a connecting arm, connecting to both ends of the elastic arm and the sidewall of the first substrate, respectively; and
a bended member, both ends thereof connecting to the elastic arm and the connecting arm, respectively.

3. The multiaxial gyroscope of claim 1, further comprising a substrate having holes, and the second ends of the plurality of elastic connecting parts respectively communicating with a sidewall of the holes.

4. The multiaxial gyroscope of claim 1, further comprising a substrate, the substrate being a securing ring, and an outer sidewall thereof connecting with the second ends of the plurality of elastics connecting parts.

5. The multiaxial gyroscope of claim 4, wherein the securing ring comprises a plurality of securing members, and a sidewall of each securing member being connected with the second end of a respective one of the plurality of elastic connecting parts.

6. The multiaxial gyroscope of claim 1, and further comprising a plurality of sensors, located above or below the vibration-sensing device, and respectively disposed in correspondence with the vibration blocks.

7. A multiaxial gyroscope, comprising:
a vibration-sensing device, the vibration-sensing device including a ring and a plurality of vibration blocks set on an inner sidewall of the ring;
a plurality of elastic connecting parts having first and second ends, the first ends of the plurality of elastic connecting parts being connected with an outer sidewall of the ring of the vibration-sensing device, the plurality of elastic connecting parts being disposed opposite to the plurality of vibration blocks;
a plurality of electrodes set on a periphery of the vibration-sensing device and respectively disposed in correspondence with the plurality of elastic connecting parts, and a potential difference existing between the vibration-sensing device and the electrodes; and
a plurality of sensors for respectively sensing vibration of the plurality of vibration blocks.

8. The multiaxial gyroscope of claim 7, and further comprising:
a plurality of first connecting parts, and both ends thereof connecting to the inner sidewall of the ring and the vibration blocks, respectively;
a plurality of second connecting parts, and both ends thereof connecting to the outer sidewall of the ring and the first ends of the elastic connecting parts, respectively;
an elastic arm, laterally opposite to the vibration blocks, and connecting with the second connecting parts;
a connecting arm, connecting to both ends of the elastic arm and the sidewall of the first substrate, respectively; and
a bended member, both ends thereof connecting to the elastic arm and the connecting arm, respectively.

9. The multiaxial gyroscope of claim 7, wherein the plurality of sensors are located above or below the vibration-sensing device and in respective correspondence with the plurality of vibration blocks.

10. The multiaxial gyroscope of claim 7, further comprising a substrate having holes, and the second ends of the plurality of elastic connecting parts respectively communicating with a sidewall of the holes.

11. The multiaxial gyroscope of claim 7, further comprising a substrate, the substrate being a securing ring, and an outer sidewall thereof connecting with the second ends of the plurality of elastics connecting parts.

12. The multiaxial gyroscope of claim 11, wherein the securing ring comprises a plurality of securing members, and a sidewall of each securing member being connected with the second end of a respective one of the plurality of elastic connecting parts.

* * * * *